US007759264B2

(12) United States Patent
Braun et al.

(10) Patent No.: US 7,759,264 B2
(45) Date of Patent: Jul. 20, 2010

(54) TEXTILE SHEET, METHOD FOR MANUFACTURING SAME, AND USE

(75) Inventors: Wolfgang Braun, Weinheim (DE); Eva Schöpping, Weinheim (DE); Oliver Staudenmayer, Weinheim (DE); Klaus Richter, Weimar (DE)

(73) Assignee: Carl Freudenberg KG, Weinheim (DE)

( * ) Notice: Subject to any disclaimer, the term of this patent is extended or adjusted under 35 U.S.C. 154(b) by 250 days.

(21) Appl. No.: 11/782,051

(22) Filed: Jul. 24, 2007

(65) Prior Publication Data

US 2008/0146106 A1 Jun. 19, 2008

(30) Foreign Application Priority Data

Jul. 25, 2006 (DE) ...................... 10 2006 034 860

(51) Int. Cl.
*B32B 15/00* (2006.01)
*B32B 15/08* (2006.01)

(52) U.S. Cl. .............................. 442/6; 442/19; 442/52; 442/58; 442/117; 28/105

(58) Field of Classification Search ................. 442/117, 442/6, 19, 52, 58; 28/105
See application file for complete search history.

(56) References Cited

U.S. PATENT DOCUMENTS

| | | | | |
|---|---|---|---|---|
| 5,484,983 | A | 1/1996 | Roell | |
| 6,281,150 | B1 | 8/2001 | Groshens | |
| 6,531,687 | B2 | 3/2003 | Michelmann | |
| 7,041,943 | B2 | 5/2006 | Michelmann | |
| 2007/0298666 | A1 | 12/2007 | Kurth | |
| 2008/0220678 | A1* | 9/2008 | Neudeck et al. | 442/110 |

FOREIGN PATENT DOCUMENTS

| | | | |
|---|---|---|---|
| CA | 2044675 | | 12/1991 |
| CA | 2238598 | A | 1/2007 |
| DE | 3741023 | A1 | 6/1989 |
| DE | 4020580 | | 1/1992 |
| DE | 9213884 | U1 | 4/1993 |
| DE | 10206336 | | 9/2003 |
| DE | 20220752 | U1 | 4/2004 |
| DE | 102004038636 | A1 | 2/2006 |
| DE | 10112405 | B4 | 5/2006 |
| DE | 102004056737 | A1 | 6/2006 |
| EP | 0243193 | A | 10/1987 |
| EP | 0532468 | B1 | 3/1993 |
| EP | 0880909 | A | 2/1998 |
| EP | 0281526 | A1 | 9/1998 |
| EP | 0937801 | A | 8/1999 |
| EP | 1330964 | A2 | 7/2003 |
| FR | 2756157 | A | 11/1996 |
| WO | 2006056414 | A | 6/2006 |

* cited by examiner

*Primary Examiner*—Ula C Ruddock
(74) *Attorney, Agent, or Firm*—Grossman, Tucker, Perreault & Pfleger, PLLC

(57) ABSTRACT

Described is a textile sheet, which in particular may be used as an interlining material in the textile industry, having a substrate based on a nonwoven fabric, woven fabric, knitted fabric, or the like. According to the invention, the substrate is provided with a mesh configuration comprising meshes of an electrically conductive material which are interlinked or interconnected in one and/or two dimensions, for example in the longitudinal and/or transverse direction. The textile sheet according to the invention is electrically conductive, and is further characterized by small thickness, low weight, high flexibility, and a very smooth textile feel. Also described is a method for manufacturing a textile sheet according to the invention, and preferred uses thereof.

15 Claims, 2 Drawing Sheets

TEXTILE SHEET, METHOD FOR MANUFACTURING SAME, AND USE

TECHNICAL FIELD

The invention relates to a textile sheet, which in particular may be used as an interlining material in the textile industry, having a substrate based on a nonwoven fabric, woven fabric, knitted fabric, or the like. The invention further relates to a method for manufacturing a textile sheet and use thereof.

PRIOR ART

Interlining materials are the unseen framework of clothing. Such materials provide correct fit and optimal comfort. Depending on the application, interlining materials assist in processability, increase functionality, and stabilize clothing. Besides clothing, these functions may find use in commercial textile applications, for example in the furniture, upholstery, and home textile industries.

Interlining materials may be composed of nonwoven fabrics, woven fabrics, knitted fabrics, or similar textile sheets, whereby interlining materials based on nonwoven fabrics made of synthetic fibers belong to the most important group of fixable interlining materials. Interlining materials are generally provided with an adhesive mass, either over the entire surface or in partial areas, and the interlining material together with an outer fabric is usually thermally treated under heat and/or pressure to allow gluing (fixing lining). The interlining material is thus fixed to an outer fabric.

The various referenced textile substrates have different property profiles, depending on the manufacturing method. Woven fabrics are composed of threads/yarns in the warp and weft directions, and knitted fabrics are composed of threads/yarns joined into a textile sheet by looping. Nonwoven fabrics are composed of individual fibers which are thermally, mechanically, or chemically bonded. The various methods for manufacturing textile sheets are known, and are described in the patent literature.

For years, heatable clothing has been in demand from innovative clothing manufacturers. Various tests have demonstrated that by means of weaving or knitting using conductive yarns, textile sheets may be produced which are heatable with the assistance of battery current (12 V, for example). In this manner a temperature in the vicinity of the body temperature is achieved within an acceptable period of time. In practice it has been shown that such systems have disadvantages in the manufacturing of clothing which thus far have prevented products which are economical and accepted by the market from becoming established.

Essentially, the disadvantages lie in the fact that weaving or knitting with conductive yarns is expensive, a relatively inflexible textile sheet is obtained, and a textile feel (smoothness) is not achievable. A further disadvantage is that cleanability (textile cleaning in organic solvents, home laundry) is problematic. Furthermore, introduction of such textile sheets into a garment is very complicated and requires significant modifications to the garment design. Supplying current to the sheets by loose cables which must be processed results in a limitation of freedom in the garment design.

DESCRIPTION OF THE INVENTION

The object of the invention is to provide an electrically conductive textile sheet which may be easily and economically manufactured and is also universally usable for many different applications. A further object of the invention is to provide a method for manufacturing such a textile sheet.

This object is achieved by a textile sheet having all the features of Claim 1, and by a method for manufacturing such a textile sheet having all the features of Claim 8. Preferred uses for such a textile sheet are stated in Claims 15 and 16. Preferred embodiments of the invention are described in the subclaims.

According to the invention, for a textile sheet which is intended in particular for use as an interlining material in the textile industry and which has a substrate made of nonwoven fabric, woven fabric, knitted fabric, or the like, the substrate is provided with a mesh configuration comprising meshes of an electrically conductive material which are interlinked or interconnected in one and/or two dimensions, for example in the longitudinal and/or transverse direction.

The meshes may be applied to the substrate surface or incorporated into the substrate surface, or also may penetrate the entire substrate. If the meshes are incorporated into the surface or penetrate the entire substrate, the mesh design is preferably selected such that, in order to form an electrically conductive area on the substrate surface, the predominant portion of the mesh material (yarn, for example) is located on this surface. One skilled in the art is familiar with suitable mesh designs, for example from knitting technology (in this case, knitting designs) by means of which such a configuration may be realized.

The meshes are interlinked or interconnected in one and/or two dimensions, for example in the longitudinal and/or transverse direction, thereby respectively ensuring either a more linear or a more planar conduction of current.

Surprisingly, it has been shown that a textile sheet with such a design not only has the necessary electrical conductivity, but also is characterized by small thickness, low weight, high flexibility, and a very smooth textile feel. The textile sheet is also easy to clean (textile cleaning, laundering).

On account of these advantageous properties, the textile sheet according to the invention is preferably used in the clothing industry for manufacturing heatable clothing, for example athletic wear, functional garments, and protective gear, among others. In this regard the textile sheet can be used universally, i.e., regardless of the particular garment design (for example, vests, jackets, blazers, and the associated cutting design of the garment parts and the industrial production process). In particular, the wear characteristics of the clothing also are not changed as a result of the very smooth textile feel.

When provided in the form of a fixable interlining material, i.e., as a fixable textile sheet, the textile sheet may be used in particular in standard clothing production. In this application the textile sheet has a sufficient separating force of at least 5 N/5 cm after fixing, cleaning, and laundering at 40° C.

DETAILED DESCRIPTION

Figure 1:
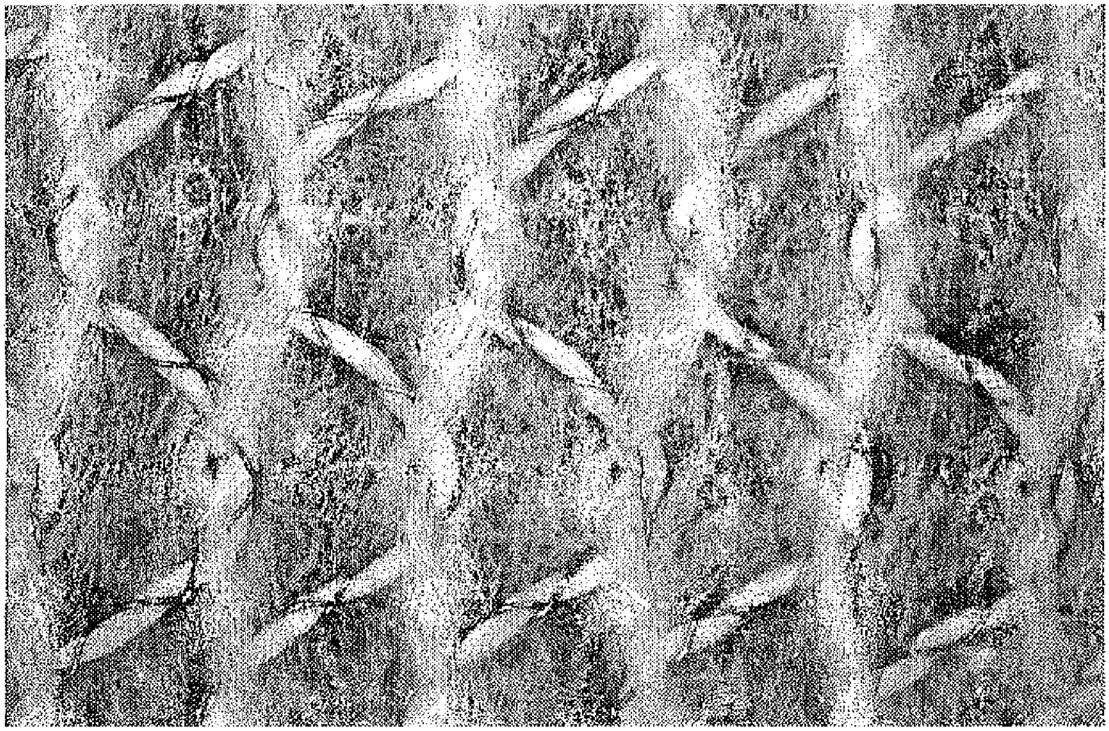
FIG. 1 is a top view of a first mesh configuration of a non-woven fabric, according to the present disclosure.

Without limiting the universality, the textile sheet according to the invention may be used as a heatable textile surface and also as a textile conduction band for supplying current. In particular when used in the clothing industry, the heatable surface as well as the current supply may be designed as a fixable, electrically conductive interlining material. An interlining material having such a design may be very easily fixed on the outer fabric of a garment, for example by ironing. A complex power cable, applied for supplying power to the heating surfaces, may be omitted. For the power supply, battery current or modified adapter current is sufficient to generate a reasonable amount of heat during an acceptable period of time.

In the manufacture of a heatable garment, a fixable textile sheet according to the invention is cut, depending on the garment section and garment design, and is fixed on the locations of the garment (back, side, front, sleeve, etc.) provided for the heating by the effect of heat and pressure on the adhesive dots on the outer fabric. Fixing methods customary in the trade (continuous fixing press, platen press, flat iron, etc.) are used. The fixing temperatures range from 70° C. to 160° C. The fixable conduction band provided according to the invention for the conduction of current is fixed on the heatable interlining in such a way that flow of current through the heatable interlining is ensured when a voltage is applied, and the conductive yarns develop the desired heat correspondingly to their selected resistance and the quantity of yarn introduced. The fixable band is connected at each end to the power source. If necessary, the contact points (fixable surface and current conduction band as well as current conduction band and battery) may be secured by overstitching with a conductive or nonconductive yarn. The power source is affixed at a suitable location in the garment.

However, as a result of the advantageous combination of a light, flexible, and, depending on the choice of substrate material, also elastic, thin, fixable textile sheet with conductive yarns, other commercial fields may be considered for which the referenced properties are advantageous, such as seat heaters, wall heaters, filter heaters, and other surface heaters for which a thin, flexible heating surface is required. Other possible applications are electrically conductive surfaces for preventing electrostatic charge or for dissipating electrostatic charge. However, in no way is the present invention limited to the referenced applications.

The electrically conductive material may comprise electrically conductive threads or threadlike material, or may comprise a combination of electrically conductive threads, also with electrically nonconductive threads or thread material.

Preferably used, however, are electrically conductive yarns or yarn combinations with electrically conductive yarns, also with nonconductive textile yarns which are twisted, intermingled, or wound.

Once again without limitation of universality, the electrically conductive yarns may be provided with a metallic coating, or may comprise metallic filaments, materials containing metallic filaments, filaments provided with a metallic coating, or combinations thereof.

A specialized yarn is selected corresponding to the intended application. For use as a heatable textile sheet, the yarns must have a sufficient resistance in order to generate the thermal output to be achieved in a defined area (high resistance). For the textile sheet used for conduction of current, the yarns must ensure current conduction with the least possible loss (low resistance). In general, the selection of the yarns with regard to conductivity/resistance, mesh formation capacity, mechanical stability, cleanability, and thermal stability, for example in fixing by means of pressure and temperature, must be selected so the particular intended use is achieved. The selection of a suitable yarn is at the disposal of one skilled in the art, who is able to find the yarn suitable for his application without having to perform inventive activity. The electrical conductivity or the electrical resistance may also be adjusted by means of the quantity of the conductive material that is applied to or introduced into the substrate.

In general, any textile materials, for example nonwoven fabrics, woven fabrics, knitted fabrics, and the like are suitable as a substrate. However, nonwoven fabrics are preferably used. In principle, due to the wide range of applications of a textile sheet according to the invention any conceivable nonwoven fabric may be used. Here as well, the selection of a suitable substrate material depends on the particular intended purpose. For applications in the clothing industry, for example, it is important that the technical garment requirements are met, for example textile feel (smoothness), thickness, stability, elasticity, dimensional change characteristics, and cleanability, among others.

As mentioned above, the textile sheet according to the invention is preferably provided as a fixable textile sheet, for example a fixable textile interlining material for the clothing industry. Thermoplastic polymers are typically used as adhesive masses. The application of an adhesive coating to a textile substrate, for example to a nonwoven fabric substrate, is sufficiently known from the field of fixable interlining materials, for example, and therefore is not further discussed here. According to one preferred design of the invention, the adhesive mass is applied, in a manner known as such, to the substrate only in partial areas. Any adhesive technology known from the prior art, for example paste dot, double dot, powder dot, or the like, is suitable for applying the adhesive dots. A double dot method is preferably used according to the invention.

When a textile sheet according to the invention is provided as a heating surface, it is advantageous when the predominant portion of the mesh material, for example the electrically conductive yarn, is located on the side of the fixable textile sheet situated opposite from the adhesive mass side in order to allow the best possible heat contact.

On the other hand, when the textile sheet is provided as a current conductor it is advantageous when the predominant portion of the mesh material, for example the electrically conductive yarn, is located on the adhesive side of the fixable textile sheet in order to electrically insulate the meshes from the surroundings.

A textile sheet according to the invention is preferably manufactured as described below:

In a first method step a substrate based on a nonwoven fabric, woven fabric, knitted fabric, or the like is produced in a manner known as such. In a next method step the substrate is provided with a mesh configuration comprising meshes of an electrically conductive material which are interlinked or interconnected in one and/or two dimensions, for example in the longitudinal and/or transverse direction. In the case of a heatable surface, for example, a two-dimensional, i.e., planar, interlinking of the meshes is recommended. In the case of a conduction band, interlinking in the form of a one-dimensional chain stitch (fringe) may be advantageous.

Numerous possibilities exist for applying the meshes to the substrate, also by hand, for example. However, in commercial manufacture the use of a knitting technique has proven to be advantageous. Preferably a warp knitting technique on warp knitting looms, and particularly preferably a double rib technique, is used as the knitting technique.

One important criterion, among others, in the selection of a suitable knitting design is the quantity of electrical material which must be applied to or introduced into the substrate in order to obtain a desired electrical conductivity or resistance, as well as the desired configuration or interlinking of the meshes.

In the present case, typical knitted good designs, for example warp fringe with weft, warp fringe with partially inserted weft, or warp fringe with inserted weft, have proven to be particularly suitable.

In order to manufacture a fixable, electrically conductive textile sheet which, for example, may be used as a fixable interlining material, the substrate is provided on at least one side with an adhesive mass. Suitable methods for this purpose have been described above. From a process economics standpoint it is advantageous to provide the substrate with the adhesive mass before application or introduction of the mesh configuration.

The invention is described in greater detail below with reference to the exemplary embodiments and figures:

Exemplary Embodiments

1. Production of a Fixable Substrate Made of Nonwoven Fabric

To produce a substrate, a nonwoven fleece (25 g/m$^2$) was carded from 100% polyamide pile fibers in 1.7 dtex. The fiber nonwoven fleece was bonded into a nonwoven fabric by calendering according to the PS process. The nonwoven fabric was printed with a thermoplastic adhesive (adhesive mass), in this case by way of example according to a double dot process using polyamide adhesive masses (9 mg/m$^2$). The dot size was mesh 52 (52 dots per cm$^2$).

2. Processing to Produce a Textile Sheet which May be Used as a Current Conductor The nonwoven fabric according to exemplary embodiment 1 above was double-ribbed on a warp knitting loom, using a conductive wound metal yarn. A knit fringe with partially inserted weft was used as the knitting design. The nonwoven fabric provided with the mesh configuration is shown in FIG. 1. Shown is a one-dimensional interlinkage of meshes in the form of an undulating configuration of the conductive yarn on the substrate.

The electrical resistance of the yarn was 3.5-4 Ω/m, with a fiber unit of 1100 dtex. A voltage of 7.6 V was applied to the current conduction band thus produced, using a battery adapter. Upon fixing on an outer fabric, a separating force of 9 N/5 cm was achieved after fixing, cleaning, and laundering at 40° C. Comparable nonconductive interlinings achieved a separating force of 10 N/5 cm.

Figure 2:
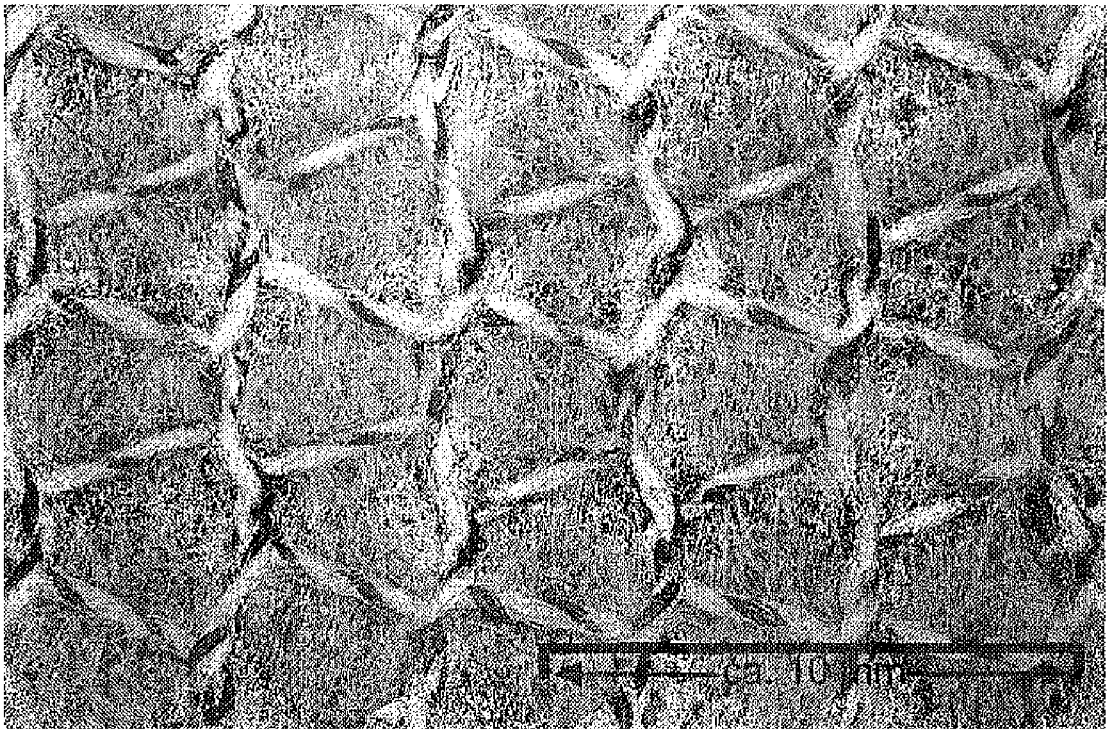
FIG. 2 is a top view of a second mesh configuration of a non-woven fabric, according to the present disclosure.

3. Processing to Produce a Textile Sheet which May be Used as a Heating Surface The nonwoven fabric according to exemplary embodiment 1 above was double-ribbed on a warp knitting loom, using a conductive covered yarn made of polyester/polyamide with a silver coating. A knit fringe with partially inserted weft was used as the knitting design. The substrate provided with the mesh configuration is shown in FIG. 2. It is seen that the meshes are interlinked in a planar manner. The planar instead of linear interlinkage of the meshes from exemplary embodiment 2 was achieved by means of a slightly different partial weft insertion. The electrical resistance of the yarn was 2-3 Ω/m, with a fiber unit of 167 dtex. A voltage of 7.6 V was applied to an area section having dimensions of 30 cm×40 cm, using a battery adapter. The textile sheet heated from 20° C. to 33° C. within 5 sec after application of the voltage.

After fixing on an outer fabric, a separating force of 9 N/5 cm was achieved after fixing, cleaning, and laundering at 40° C. Comparable nonconductive interlinings achieved a separating force of 10 N/5 cm.

What is claimed is:

1. Textile sheet, which may be used as an interlining material in the textile industry, including a substrate having one or more sides and comprising a nonwoven fabric, woven fabric or knitted fabric, wherein the substrate is provided with a mesh configuration located on one side and comprising meshes of an electrically conductive material which are interlinked or interconnected in one or more two dimensions, wherein the electrically conductive material is an electrically conductive yarn or a yarn combination comprising electrically conductive yarns, wherein said yarn or yarn combination is twisted, intermingled or wound.

2. Textile sheet according to claim 1, wherein the electrically conductive yarn comprises metallic filaments, materials containing metallic filaments, filaments provided with a metallic coating, or combinations thereof, as well as mixtures of conductive yarns with textile yarns which are twisted, intermingled, or wound.

3. Textile sheet according to claim 1, wherein the substrate is provided on at least one side with an adhesive mass coating.

4. Textile sheet according to claim 3, wherein the adhesive mass is applied to the substrate only in partial areas, in particular in the form of adhesive dots.

5. Textile sheet according to claim 3, wherein the electrically conductive mesh material is predominantly located on the adhesive mass side of the fixable textile sheet.

6. Textile sheet according to claim 3, wherein the electrically conductive mesh material is predominantly located on the side of the fixable textile sheet situated opposite from the adhesive mass side.

7. The textile sheet according to claim 1 wherein said textile sheet comprises a textile heating surface, in the form of a heatable, fixable textile interlining material in the clothing industry.

8. The textile sheet according to claim 1 wherein said textile sheet comprises a textile conduction band.

9. Method for manufacturing a textile sheet, which preferably may be used as a textile interlining material, according to claim 1, wherein by the following method steps:

a) Producing a substrate based on a nonwoven fabric, woven fabric, knitted fabric, or the like;

b) Providing the substrate with a mesh configuration comprising meshes of an electrically conductive material which are interlinked or interconnected in one and/or two dimensions.

10. Method according to claim 9, wherein the mesh configuration is used in the form of a knitting design by use of a knitting technique, preferably a warp knitting technique.

11. Method according to claim 10, wherein warp fringe with weft or warp fringe with inserted weft is used as the knitting technique.

12. Method according to claim 9, wherein an adhesive mass is applied to at least one side of the substrate.

13. Method according to claim 12, wherein the adhesive mass is applied to the substrate before the mesh configuration made of electrically conductive material is applied.

14. Method according to claim 12, wherein the adhesive mass is applied only in partial areas, in particular in the form of adhesive dots.

15. Method according to claim 14, wherein the adhesive mass is applied by use of a double dot method.

* * * * *